US011257222B2

United States Patent
Gan et al.

(10) Patent No.: US 11,257,222 B2
(45) Date of Patent: Feb. 22, 2022

(54) ITERATIVE APPROACH FOR WEAKLY-SUPERVISED ACTION LOCALIZATION

(71) Applicant: International Business Machines Corporation, Armonk, NY (US)

(72) Inventors: Chuang Gan, Cambridge, MA (US); Yang Zhang, Cambridge, MA (US); Sijia Liu, Somerville, MA (US); Dakuo Wang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 16/292,847

(22) Filed: Mar. 5, 2019

(65) Prior Publication Data
US 2020/0286243 A1 Sep. 10, 2020

(51) Int. Cl.
*G06T 7/215* (2017.01)
*G06K 9/62* (2006.01)
(Continued)

(52) U.S. Cl.
CPC .............. *G06T 7/215* (2017.01); *G06F 16/75* (2019.01); *G06K 9/00718* (2013.01);
(Continued)

(58) Field of Classification Search
CPC ........... G06K 9/00744; G06K 9/00765; G06K 9/00718; G06K 9/00751; G06K 2209/01;
(Continued)

(56) References Cited

U.S. PATENT DOCUMENTS 9,620,168 B1 * 4/2017 Townsend ................. G06T 7/60
9,736,503 B1 * 8/2017 Bakshi ................. H04N 21/262
(Continued)

OTHER PUBLICATIONS

Anonymous; "Breaking Winner-takes-all: An Iterative-Winners-Out Network for Weakly Supervised Action Localization"; 2018 Association for Computing Machinery, ACM ISBN 978; 9 pages.
(Continued)

*Primary Examiner* — Golam Sorowar
(74) *Attorney, Agent, or Firm* — Cantor Colburn LLP; Stosch Sabo

(57) ABSTRACT

Embodiments of the present invention are directed to a computer-implemented method for action localization. A non-limiting example of the computer-implemented method includes receiving, by a processor, a video and segmenting, by the processor, the video into a set of video segments. The computer-implemented method classifies, by the processor, each video segment into a class and calculates, by the processor, importance scores for each video segment of a class within the set of video segments. The computer-implemented method determines, by the processor, a winning video segment of the class within the set of video segments based on the importance scores for each video segment within the class, stores, by the processor, the winning video segment from the set of video segments, and removes the winning video segment from the set of video segments.

20 Claims, 7 Drawing Sheets

(51) Int. Cl.
*G06N 3/04* (2006.01)
*G06N 20/00* (2019.01)
*G06F 16/75* (2019.01)
*G06K 9/00* (2006.01)

(52) U.S. Cl.
CPC ............ *G06K 9/628* (2013.01); *G06N 3/04* (2013.01); *G06N 20/00* (2019.01); *G06K 2009/00738* (2013.01); *G06T 2207/20112* (2013.01)

(58) Field of Classification Search
CPC ....... G06K 9/6256; G06K 2009/00738; G06K 9/00221; G06K 9/00255; G06K 9/00288; G06K 9/00342; G06K 9/00711; G06K 9/623; G06K 9/6267; G06K 9/726; H04N 21/8456; H04N 21/23418; H04N 5/91; H04N 21/23439; H04N 21/262; H04N 21/44209; H04N 21/8106; H04N 21/8549; H04N 5/775; H04N 21/233; H04N 21/23424; H04N 21/234327; H04N 21/251; G06T 2207/10016; G06T 7/20; G06T 2207/20081; G06T 7/136; G06T 7/194; G06T 7/215
See application file for complete search history.

(56) References Cited

U.S. PATENT DOCUMENTS

| | | | |
|---|---|---|---|
| 9,846,840 B1 | 12/2017 | Lin et al. | |
| 10,013,637 B2 | 7/2018 | Misra et al. | |
| 10,055,685 B1 | 8/2018 | Arel et al. | |
| 2011/0293250 A1* | 12/2011 | Deever | H04N 5/275 386/290 |
| 2016/0034786 A1* | 2/2016 | Suri | G06K 9/6256 382/159 |
| 2018/0020243 A1* | 1/2018 | Ni | G11B 27/031 |
| 2019/0228231 A1* | 7/2019 | Tandon | G06K 9/00765 |

OTHER PUBLICATIONS

Bency et al.; "Weakly Supervised Localization using Deep Feature Maps"; arXiv:1603.00489v2 [cs.CV]; Mar. 29, 2016; 20 pages.

Chen et al.; "Learning a Compact Latent Representation of the Bag-of-Parts Model"; 2014 IEEE Int. Conf. on Image Processing (ICIP), Paris, 2014; 5 pages.

Juneja et al.; "Blocks that Shout: Distinctive Parts for Scene Classification"; 2013 IEEE Conference on Computer Vision and Pattern Recognition, Portland, OR, 2013; 8 pages.

Mell et al.; "The NIST Definition of Cloud Computing—Recommendations of the National Institute of Standards and Technology"; U.S. Department of Commerce; Sep. 2011; 7 pages.

Misra et al.; "Data-driven Exemplar Model Selection"; IEEE Winter Conf. on Applications of Computer Vision (2014); 8 pages.

Nguyen et al.; "Weakly Supervised Action Localization by Sparse Temporal Pooling Network"; arXiv:1712.05080v2 [cs.CV]; Apr. 3, 2018; 10 pages.

Wang et al.; "UntrimmedNets for Weakly Supervised Action Recognition and Detection"; arXiv:1703.03329v2 [cs.CV]; May 22, 2017; 10 pages.

Zhao et al.; "Temporal Action Detection with Structured Segment Networks"; arXiv: 1704.06228 [cs.CV]; Apr. 20, 2017; 10 pages.

\* cited by examiner

ITERATIVE APPROACH FOR WEAKLY-SUPERVISED ACTION LOCALIZATION

BACKGROUND

The present invention generally relates to computer systems and more specifically, to computer systems configured to implement video editing techniques that include an iterative approach for weakly-supervised action localization.

Editing video requires video segments to be identified and tagged with the action located in the video. This is known as action localization. Action localization is useful to flag segments of video that may have actions taking place such as, for example, swinging a golf club, running down a track, or jumping to return a volleyball batted over a net. Action localization requires intensive supervision and manual input.

SUMMARY

Embodiments of the present invention are directed to a computer-implemented method for action localization. A non-limiting example of the computer-implemented method includes receiving, by a processor, a video and segmenting, by the processor, the video into a set of video segments. The computer-implemented method classifies, by the processor, each video segment into a class and calculates, by the processor, importance scores for each video segment of a class within the set of video segments. The computer-implemented method determines, by the processor, a winning video segment of the class within the set of video segments based on the importance scores for each video segment within the class, stores, by the processor, the winning video segment from the set of video segments, and removes the winning video segment from the set of video segments.

Embodiments of the present invention are directed to a system for action localization. A non-limiting example of the system includes a processor and memory coupled to the processor. The memory has stored therein instructions that when executed cause the processor to receive a video and segment the video into a set of video segments. The instructions classify each video segment into a class and calculate importance scores for each video segment of a class within the set of video segments. The instructions determine a winning video segment of the class within the set of video segments based on the importance scores for each video segment within the class, stores the winning video segment from the set of video segments, and removes the winning video segment from the set of video segments.

Embodiments of the invention are directed to a computer program product for action localization, the computer program product comprising a computer readable storage medium having program instructions embodied therewith. The program instructions are executable by a processor to cause the processor to perform a method. A non-limiting example of the method includes receiving a video and segmenting the video into a set of video segments. The method classifies each video segment into a class and calculates importance scores for each video segment of a class within the set of video segments. The method determines a winning video segment of the class within the set of video segments based on the importance scores for each video segment within the class, stores the winning video segment from the set of video segments, and removes the winning video segment from the set of video segments.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
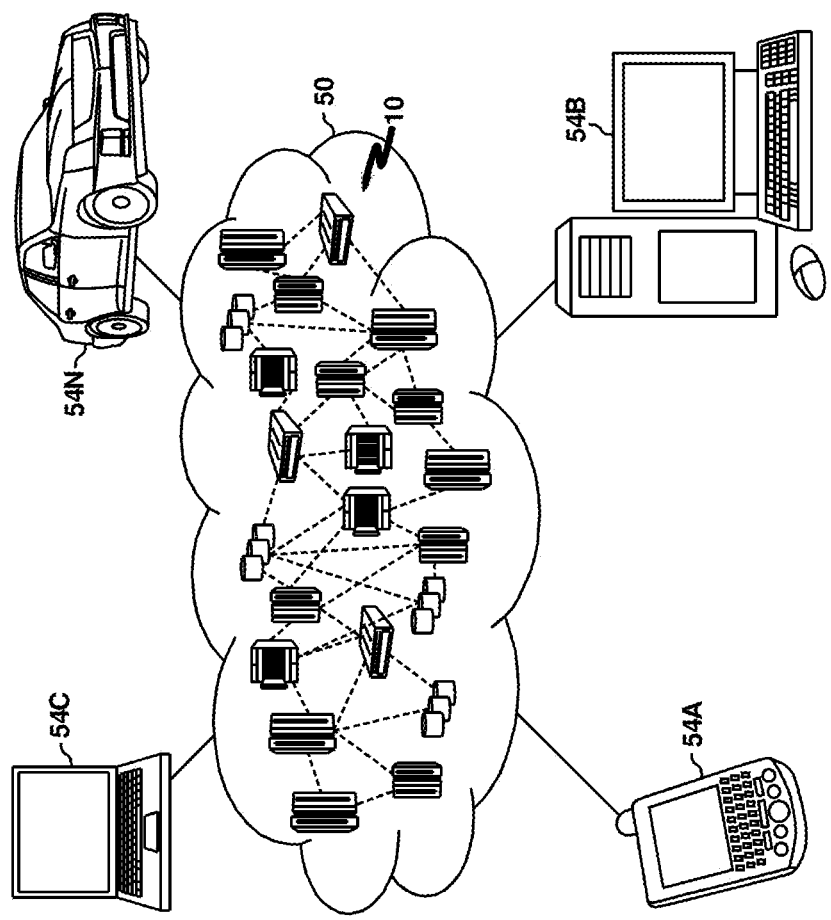
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
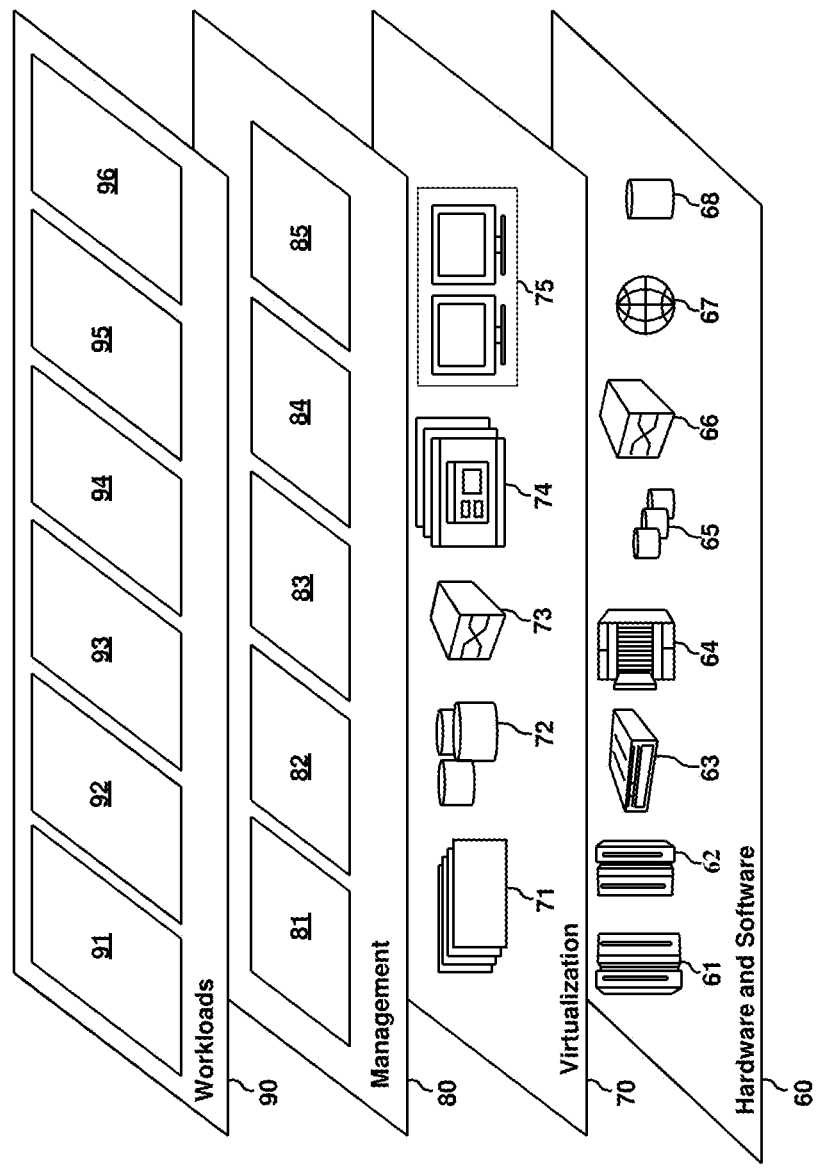
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action localization processing 96.

Figure 3:
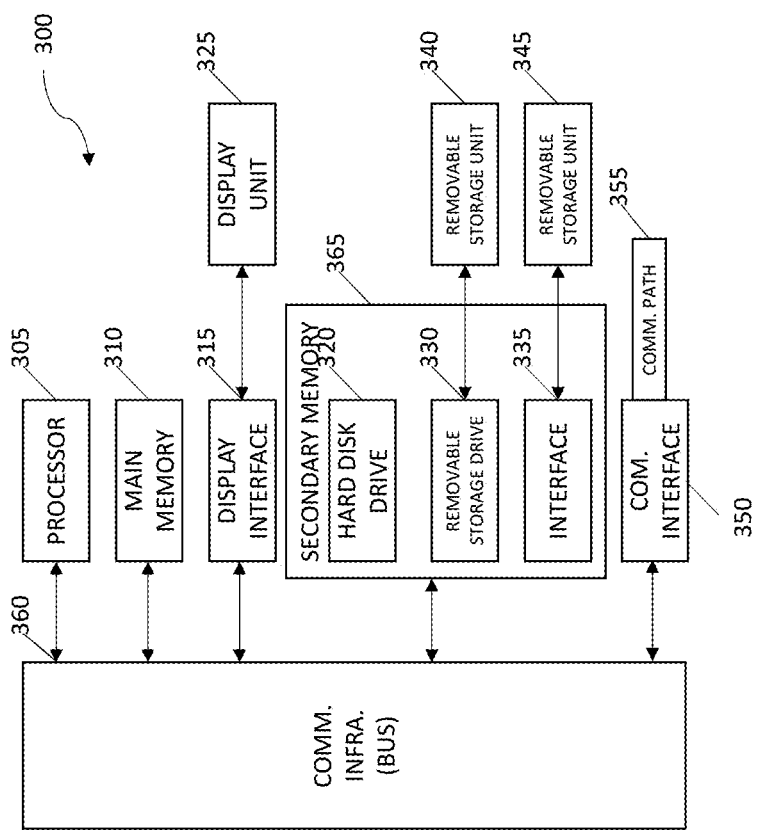
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, the invention addresses the problem of weakly supervised temporal action localization from unconstrained web videos, where only the video-level action labels are available during training. Recently, the problem of temporal action localization has been extensively studied. However, most existing methods heavily rely on temporal annotations containing the category label of each action item and its time interval. Manually annotating actions frame by frame is not only time-consuming, but also subject to the annotators, leading to the annotations to be severely biased.

The current approach is to divide video into segments manually, by assigning each segment an attention weight and localize action instances according to the attention weights. The issue with this methodology is that it creates a winner-takes-all phenomenon where the most discriminative segment will be assigned with the largest weight and selected, and the scores of the less discriminative segments will be suppressed and not used.

Turning now to an overview of the aspects of the invention, one or more embodiments of the invention address the above-described shortcomings of the prior art by providing a solution where manual temporal annotations are not necessary. Instead, temporal annotations are made through use of machine learning algorithms that identify segments, label them, and then iteratively remove winning segments in order to properly identify relevant segments. The invention provides an iterative-winners-out method and a corresponding training strategy to select action instances iteratively without the help of temporal annotations.

The above-described aspects of the invention address the shortcomings of the prior art by providing an iterative-winners-out network for weakly supervised temporal action localization. The invention solves the problem of temporal action localization under weakly supervised conditions, where only the video-level action labels are provided, but the action time intervals and their exact labels are no longer required. The invention iteratively removes the action segments strongly corresponding to a video label, which allows the method to localize each of the instances in the video, including the most discriminative and the less discriminative ones. This class-discriminative localization technique also proves to more effective than those mechanisms based solely on attention.

Figure 4:
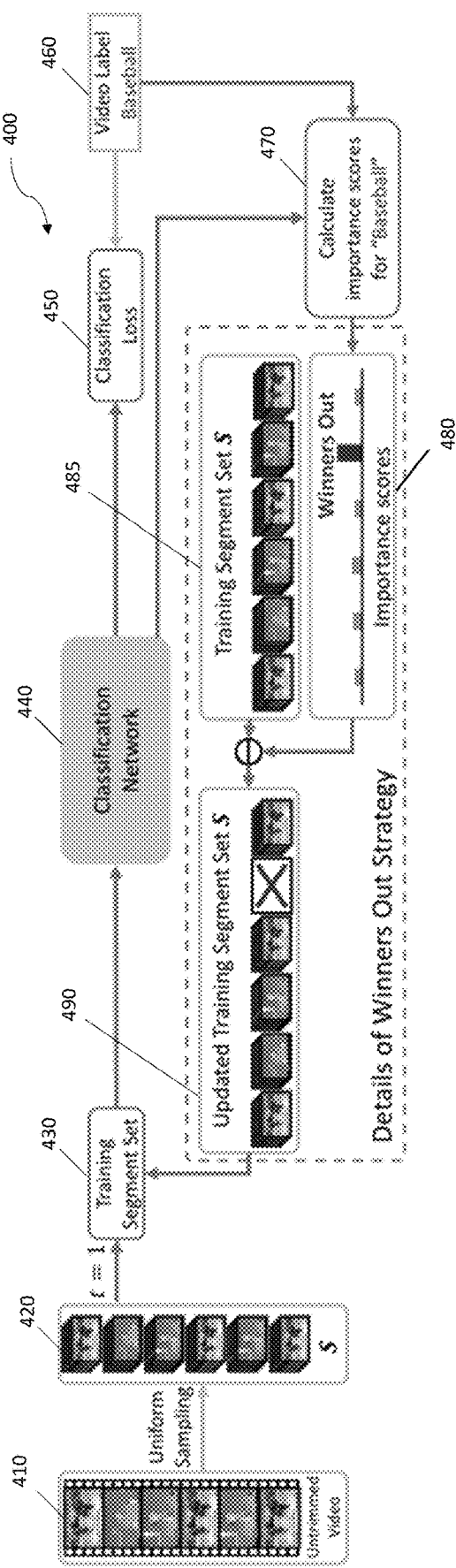
FIG. 4 depicts a system for temporal action localization in accordance with an embodiment of the present invention.

Turning now to a more detailed description of aspects of the present invention, FIG. 4 depicts system 400 for temporal action localization in accordance with an embodiment of the present invention. This method iteratively localizes the most discriminative segments and removes them from a training set to train the network in the next step. In the following, iterative steps, additional discriminative segments will be identified and removed, and the process repeats itself until each discriminative segment has been found, identified, and removed.

While the system 400 is described with respect to implementation in the system 300 shown in FIG. 3, it may also be implemented in the cloud 50 as shown in FIGS. 1 and 2. An untrimmed video 410 is provided to the system from main memory 310 or secondary memory 365. The untrimmed video need not be segmented or tagged. The processor 305 performs uniform sampling to generate a training segment set S of video segments. The first training segment set S 430 is provided to a classification network 440 that classifies, using processor 305, the segments in the first training segment set S based on a video label 460 provided. The classification network 440 may be a neural network. Some classification loss 450 may occur during this process. Importance scores are calculated 470, by processor 305, for each of the segments in the first training segment set S. Importance scores may be calculated using a neural network. The segment with the highest importance score is deemed the winner 480 by processor 305, and once identified, removed from training segment set S 485 and set aside in main memory 310 or secondary memory 365, so that the training segment set S is reduced to form an updated training segment set S 490. The updated training segment set S is then brought back to stage 430 where the process is repeated by processor 305. The process repeats until each of the winning segments are identified, removed, and set aside. Through this iterative process each of the winning segments are found, including the least discriminative segments.

Figure 5:
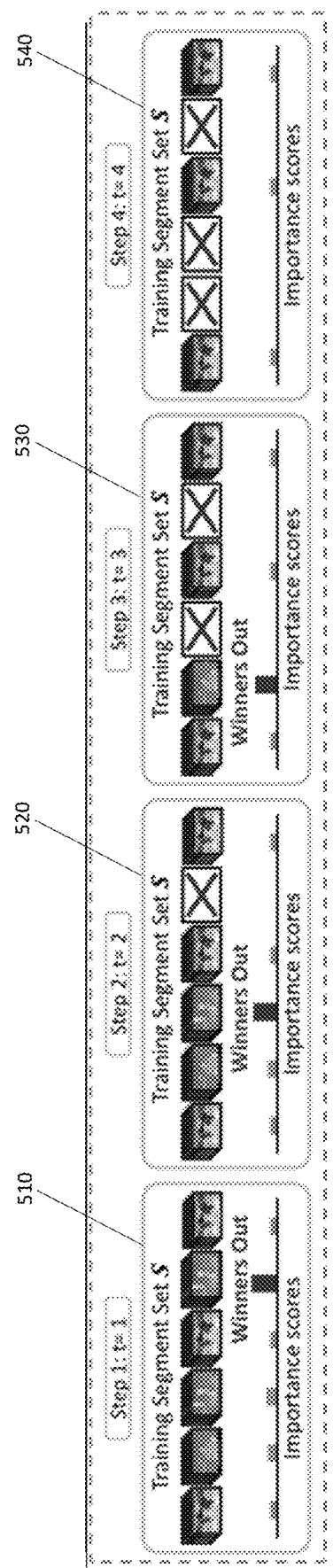
FIG. 5 depicts an example of temporal action localization over multiple iterations in accordance with an embodiment of the present invention.

FIG. 5 depicts an example of temporal action localization over multiple iterations in accordance with an embodiment of the present invention. To continue the iterative process shown in FIG. 4, this example is presented. At a first pass through the system 400 in FIG. 4 510, the processor 305 identifies a first segment as the winner and it is removed from the training segment set and set aside in main memory 310 or secondary memory 365. At a second pass through the system 400 in FIG. 4 520, the processor 305 identifies a second segment as the winner and it is removed from the training segment set and set aside in main memory 310 or secondary memory 365. At a third pass through the system 400 in FIG. 4 520, the processor 305 identifies a third segment as the winner and it is removed from the training segment set and set aside in main memory 310 or secondary memory 365. At a fourth pass through the system 400 in FIG. 4 520, the processor 305 identifies a fourth segment as the winner and it is removed from the training segment set and set aside in main memory 310 or secondary memory 365. Following this last pass, no more potentially winning segments are present in the training segment set S.

Figure 6:
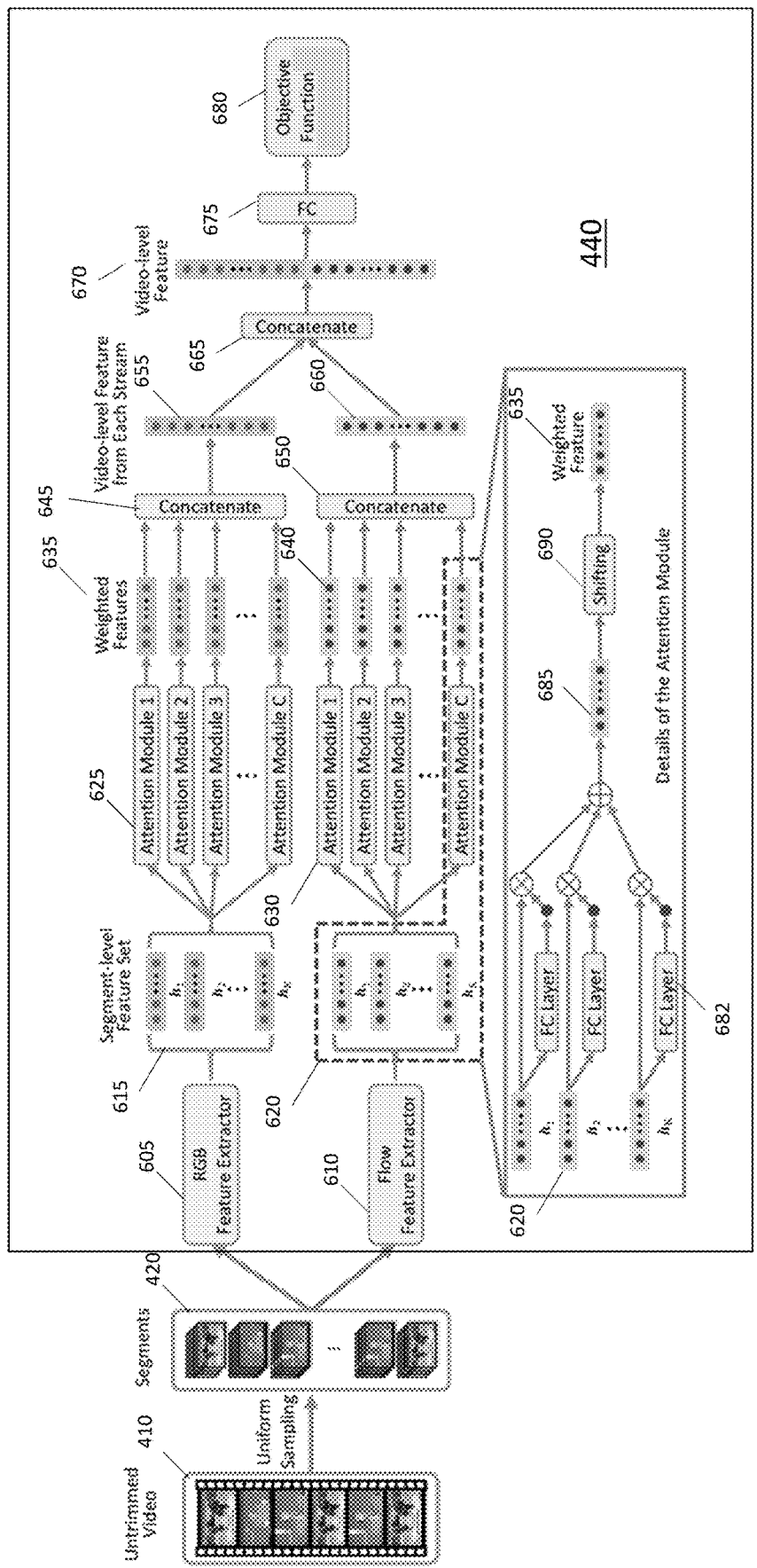
FIG. 6 depicts a flow diagram of a classification network used in temporal action localization in accordance with an embodiment of the present invention.

FIG. 6 depicts a flow diagram of a classification network used in temporal action localization in accordance with an embodiment of the present invention. The classification network uses machine learning implemented by the system 300 in FIG. 3. It may also be implemented in the cloud as shown in FIGS. 1 and 2. Untrimmed video 410 is received from main memory 310 or secondary memory 365. It is divided into segments 420 by processor 305 as previously described. An RGB Feature Extractor 605 extracts RGB features from each of the segments using processor 305, and a Flow Feature Extractor 610 extracts flow features from each of the segments using processor 305. Segment level feature sets are identified by processor 305 through hidden layers, $h_t$, 615 and 620. An Attention Module 635 operates on processor 305 on each of the hidden layers to provide weighted features 635 and 640. The weighted features of the hidden layers are concatenated 645 and 650 by processor 305 to form video-level features 655 and 660 from each of the two streams. The video level features from each stream 655 and 660 are concatenated 665 by processor 305 to form video-level feature 670. The fully connected layer 675 is applied by processor 305 to yield the result of the classification 680. Details of the Attention Model are next described illustrating the hidden layers 620 being supplied to the fully connected layers 682. The results are summed 685 and shifted 690 to provide the weighted features 635.

A training and localization action can be performed by processor 305 to calculate the attention weight for each segment. The video-level feature is then identified and classified by processor 305 in order to train the system. The attention weights and weights of the classifier can be used to measure the importance of each segment.

Figure 7:
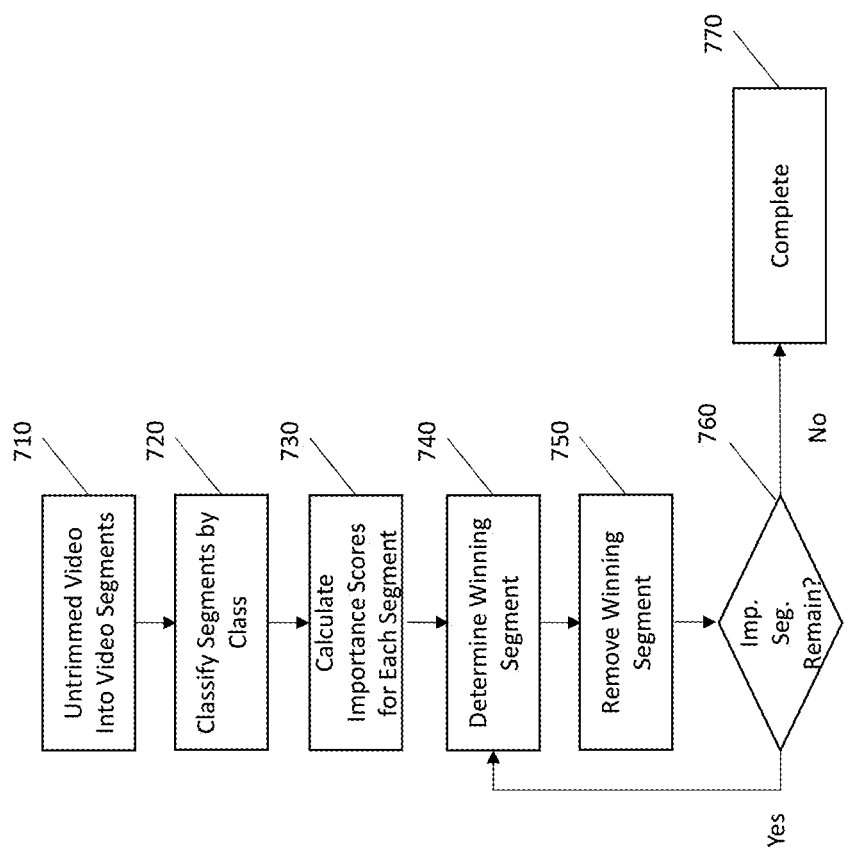
FIG. 7 depicts a flow chart of a temporal action localization method in accordance with an embodiment of the present invention.

FIG. 7 depicts a flow chart of a temporal action localization method in accordance with an embodiment of the present invention. While the method is shown with respect to implementation in the system 300 described in FIG. 3, it may also be implemented in the cloud as shown in FIGS. 1 and 2. An untrimmed video from main memory 310 or secondary memory 365 is received and converted into video segments by processor 305. (Stage 710). Processor 305 classifies each of the segments by class. (Stage 720). The classes may be provided by a user or read from a database of classes. The processor 305 calculates importance scores for each segment. (Stage 730). The processor 305 identifies a winning segment based on the highest importance score. (Stage 740). The processor 305 removes the winning segment from the video segments being analyzed and stores the winning segment in main memory 310 or secondary memory 365. Processor 305 makes a check to determine if there are further important segments remaining among the segments based on a segment having an importance score above a threshold amount. (Stage 760). If none, processing is complete. (Stage 770). If important segments remain, flow returns to stage 740 where the process is repeated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a video;
   segmenting, by the processor, the video into a set of video segments;
   extracting, by the processor, a set of red-green-blue features and a set of flow features from the set of video segments;
   weighting, by the processor and via an attention model, the set of red-green-blue features and the set of flow features to generate a first set of video features from the set of red-green-blue features and a second set of video features from the set of flow features;
   concatenating, by the processor, the first set of video features and the second set of video features to generate video level features;
   classifying, by the processor, each video segment into a class based on applying the video level features to an objection function;
   calculating, by the processor, first importance scores for each video segment of a class within the set of video segments;
   determining, by the processor, a winning video segment of the class within the set of video segments based on the importance scores for each video segment within the class;
   storing, by the processor, the winning video segment from the set of video segments, removing the winning video segment from the set of video segments, and setting aside the winning video segment into main memory or secondary memory;
   determining, by the processor, whether any remaining video segments have a first importance score above a threshold importance score; and
   calculating, by the processor, second importance scores for each remaining video segment, having a first importance score above a threshold importance score, of the class within the set of video segments.

2. The computer-implemented method of claim 1 further comprising, after removing the winning video segment from the set of video segments, determining, by the processor, a second winning video segment of the class within the remaining video segments based on the importance scores for each video segment within the class, storing, by the processor, the second winning video segment from the remaining video segments, and removing the second winning video segment from the remaining video segments.

3. The computer-implemented method of claim 1, wherein classifying each video segment into a class comprises utilizing machine learning to classify each video segment into a class.

4. The computer-implemented method of claim 3 further comprising using an attention model within a neural network to classify each video segment into a class.

5. The computer-implemented method of claim 1 further comprising receiving, by the processor, the class from a user.

6. The computer-implemented method of claim 1 further comprising receiving, by the processor, the class from a database.

7. The computer-implemented method of claim 1, wherein calculating, by the processor, importance scores for each video segment of a class within the set of video segments comprises calculating importance scores using a neural network.

8. A system comprising:
   a processor;
   a memory communicatively coupled to the processor, the memory having stored therein instructions that when executed cause the processor to:
   receive a video;
   segment the video into a set of video segments;
   extract a set of red-green-blue features and a set of flow features from the set of video segments;
   weight, via an attention model, the set of red-green-blue features and the set of flow features to generate a first set of video features from the set of red-green-blue features and a second set of video features from the set of flow features;

concatenate the first set of video features and the second set of video features to generate video level features;

classify each video segment into a class based on applying the video level features to an objection function;

calculate first importance scores for each video segment of a class within the set of video segments;

determine a winning video segment of the class within the set of video segments based on the importance scores for each video segment within the class;

store the winning video segment from the set of video segments, remove the winning video segment from the set of video segments, and set aside the winning video segment into main memory or secondary memory;

determine whether any remaining video segments have a first importance score above a threshold importance score; and calculate second importance scores for each remaining video segment, having a first importance score above a threshold importance score, of the class within the set of video segments.

9. The system of claim 8 having stored therein further instructions that when executed cause the processor to, after removing the winning video segment from the set of video segments, determine a second winning video segment of the class within the remaining video segments based on the importance scores for each video segment within the class, store the second winning video segment from the remaining video segments, and remove the second winning video segment from the remaining video segments.

10. The system of claim 8, wherein classifying each video segment into a class comprises utilizing machine learning to classify each video segment into a class.

11. The system of claim 10 having stored therein further instructions that when executed cause the processor to use an attention model within a neural network to classify each video segment into a class.

12. The system of claim 8 having stored therein further instructions that when executed cause the processor to receive the class from a user.

13. The system of claim 8 having stored therein further instructions that when executed cause the processor to receive the class from a database.

14. The system of claim 8, wherein calculating importance scores for each video segment of a class within the set of video segments comprises calculating importance scores using a neural network.

15. A computer program product for action localization, the computer program product comprising a computer readable storage medium having program instructions embodied therewith, the program instructions executable by a processor to cause the processor to:

receive a video;

segment the video into a set of video segments;

extract a set of red-green-blue features and a set of flow features from the set of video segments;

weight, via an attention model, the set of red-green-blue features and the set of flow features to generate a first set of video features from the set of red-green-blue features and a second set of video features from the set of flow features;

concatenate the first set of video features and the second set of video features to generate video level features;

classify each video segment into a class based on applying the video level features to an objection function;

calculate first importance scores for each video segment of a class within the set of video segments;

determine a winning video segment of the class within the set of video segments based on the importance scores for each video segment within the class;

store the winning video segment from the set of video segments, remove the winning video segment from the set of video segments, and set aside the winning video segment into main memory or secondary memory;

determine whether any remaining video segments have a first importance score above a threshold importance score; and calculate second importance scores for each remaining video segment, having a first importance score above a threshold importance score, of the class within the set of video segments.

16. The computer program product of claim 15 having program instructions that when executed cause the processor to, after removing the winning video segment from the set of video segments, determine a second winning video segment of the class within the remaining video segments based on the importance scores for each video segment within the class, store the second winning video segment from the remaining video segments, and remove the second winning video segment from the remaining video segments.

17. The computer program product of claim 15, wherein classifying each video segment into a class comprises utilizing machine learning to classify each video segment into a class.

18. The computer program product of claim 15 having program instructions that when executed cause the processor to receive the class from a user.

19. The computer program product of claim 17 having program instructions that when executed cause the processor to use an attention model within a neural network to classify each video segment into a class.

20. The computer program product of claim 15, wherein calculating importance scores for each video segment of a class within the set of video segments comprises calculating importance scores using a neural network.

* * * * *